Sept. 4, 1928.

E. ALTENKIRCH 1,683,434

METHOD OF HEATING BUILDINGS

Filed Sept. 17, 1925    2 Sheets-Sheet 1

Inventor
Edmund Altenkirch
by Knight

Patented Sept. 4, 1928.

1,683,434

UNITED STATES PATENT OFFICE.

EDMUND ALTENKIRCH, OF ALT-LANDSBERG-SUD, GERMANY, ASSIGNOR TO SIEMENS-SCHUCKERTWERKE GESELLSCHAFT MIT BESCHRANKTER HAFTUNG, OF SIEMENS-STADT, GERMANY, A CORPORATION OF GERMANY.

METHOD OF HEATING BUILDINGS.

Application filed September 17, 1925, Serial No. 56,966, and in Germany January 9, 1924.

My invention relates to a method of heating buildings. The heating of buildings during the winter free of cost appears at first a problem incapable of solution. According to my invention the problem is solved by utilizing differences of temperature as they occur in nature, for instance the temperature head between the cold atmospheric air and the heat of the ground as, for instance, available in the ground or subsoil water, in an absorption machine which operates on the re-absorption principle. The heat for heating purposes is in my method generated by the absorption of a gas by a liquid. The gas is then expelled again from the solution at a lower pressure by the ground or terrestrial heat and condensed by the cold of the atmospheric air. The condensed gas is then evaporated again at a higher pressure by the terrestrial heat whereupon the cycle begins again. The method is rendered particularly valuable if an absorption machine is employed which requires for its operation merely an existing temperature head, but no pumps, valves or other movable parts whatever. The machine then requires neither attention nor lubrication and works entirely free of cost.

Figure 1:
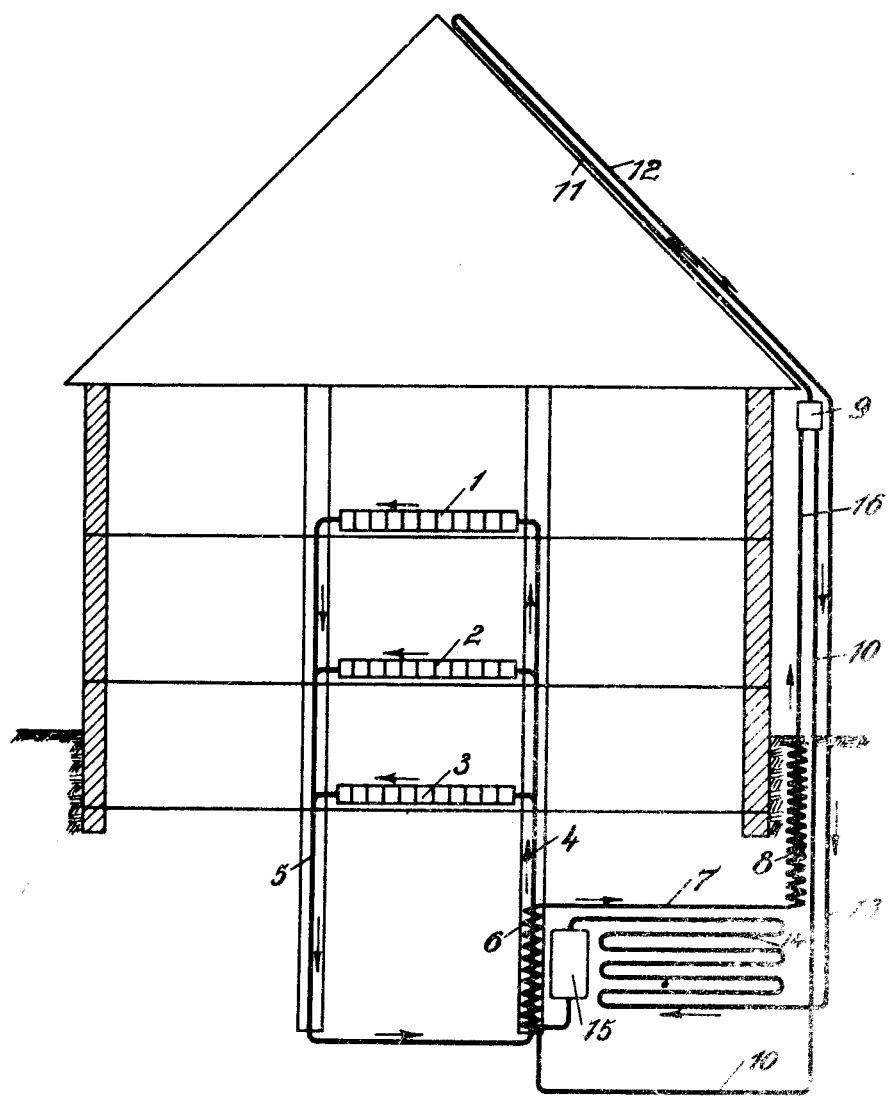
Figure 2:
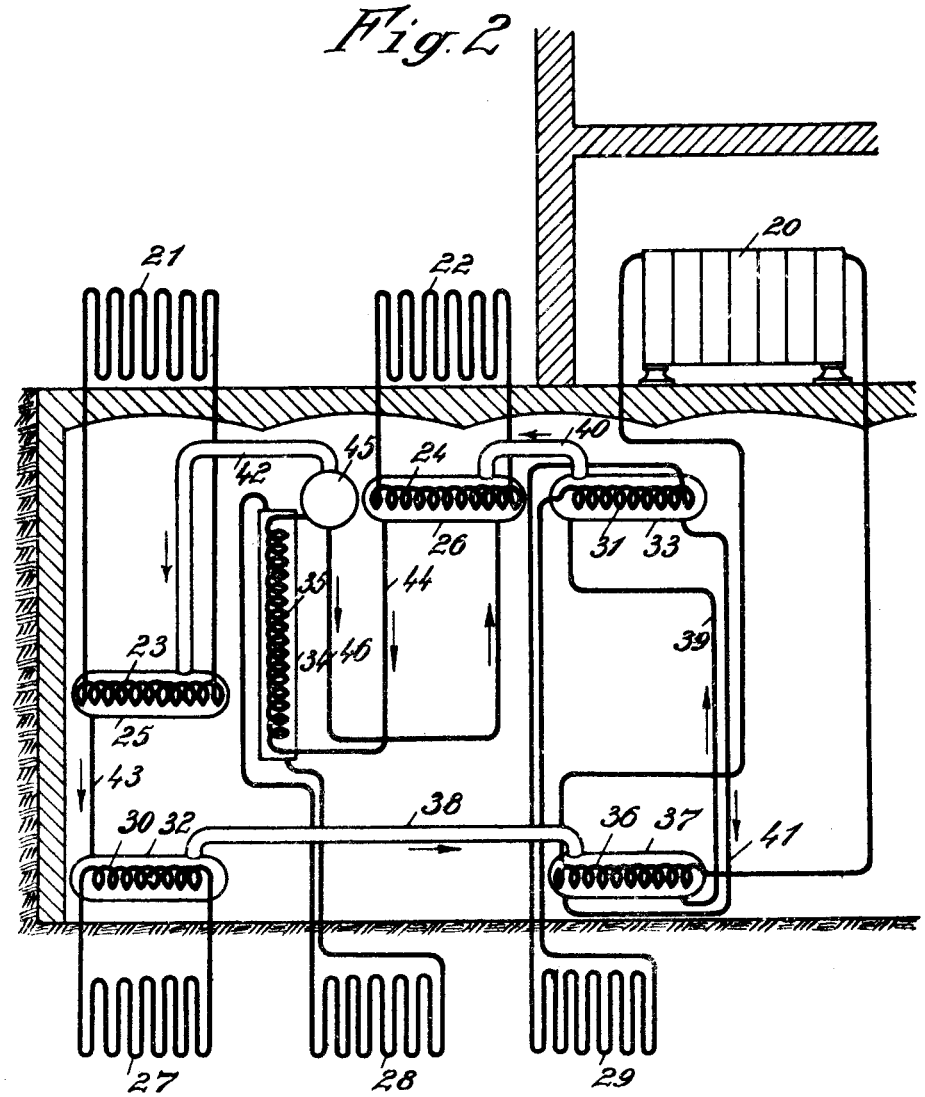

Embodiments of my invention are diagrammatically illustrated in the drawing in which Fig. 1, shows a complete heating installation for a building and Fig. 2, a somewhat modified plant.

Referring to Fig. 1 of the drawings 1, 2, 3 are radiators for heating the building indicated in outline, hot water being circulated through said radiators by the pipes 4 and 5. The water is heated by a re-absorption vessel 6 in the form of a coiled pipe wound around the ascending pipe or riser 4. In this vessel a gaseous working medium is absorbed by a liquid. The heat generated in this process is the heating energy gained which is transmitted to the water flowing in the pipe 4. The solution enriched by the gas reaches a gas expeller vessel 8 through a narrow throttling pipe 7. In this vessel 8 prevails a lower pressure so that the heat of the ground suffices to expel the gas again from the liquid. The gas driven off carries the liquid upwards through a pipe 16 into a gas separation chamber 9. Here liquid and gas are separated. The depleted solution returns through a pipe 10 into the re-absorption vessel 6 while the gas reaches the condenser 12 through a pipe 11. This condenser consists of a system of pipes mounted upon the roof of the house so that it is permanently cooled by the cold of the external air. The gas condenser and the condensate flows through the pipe 13 into the evaporator 14. Owing to the column of liquid in the pipe 13 the pressure in the evaporator 14 is higher than in the condenser 12. Since, however, the ground is warmer than the atmospheric air the condensate evaporates again in spite of the higher pressure. The vapor generated is conducted into a collector vessel 15 and hence returns into the re-absorber where it is absorbed anew by depleted solution. Provided the vessels and the pipe lines in which the working liquid of the absorption machine circulates are well sealed the machine works indefinitely without requiring any supervision, renewal or the like.

In a rough calculation it may be assumed that the temperature of the re-absorber 6 rises as high above the temperature of the underground vessels 8 and 14 as the temperature of the pipe system 12 exposed to the cold air lies below it. If the system of air-cooled pipes 12 is thus cooled to $-20°$ C. and the vessels 8 and 14 are maintained at $10°$ C., the temperature in the re-absorber 6 may be brought to approximately $40°$. It is, however, possible to manage with a smaller temperature difference or head between the ground and the atmospheric air or to attain at the same given temperature difference a higher heating temperature if an apparatus according to Fig. 2 is employed. The radiator which may serve to heat any enclosed space is designated by 20. The coils 21 and 22 are exposed to the cold outer air. Within them circulates a liquid as carrier of cold which cools the vessels 25 and 26 by means of the coils 23 and 24. The coils 27, 28, 29 are embedded in the soil. In the coils 27 and 29 a liquid circulates as carrier of heat which conveys heat to the vessels 32 and 33 by means of the pipe coils 30 and 31. The liquid circulating through the coil 28 traverses a heating vessel 34 which serves to heat the vaporizing coil 35.

The radiators 20, of which only one is shown as an example, are traversed by a liquid which is heated in the coil 36 in the re-absorber vessel 37. In this vessel 37 the gas is absorbed which enters through the pipe 38. The liquid thus enriched by the gas ascends through a pipe 39 into the gas expeller 33 which is heated by the coil 31 from sub-soil coil 29. The expelled gas is led away by the pipe 40 while the depleted solution returns into the re-absorber 37 through the pipe 41. The pipes 39 and 41 are preferably in customary manner placed so close together that an exchange of heat between them is rendered possible. The circulation between the re-absorber 37 and the gas expeller 33 is brought about by the fact that the gas enriched solution in the pipe 39 is specifically lighter than the depleted solution in the pipe 41. The pressure prevailing in the gas expeller 33 is lower than that in the re-absorber 37 in correspondence with the columns of liquid between the two. The gas escaping through the pipe 40 passes into a system which will be described further on and thence through the pipe 42 into a condenser 25. Here it is condensed at a medium pressure by the medium circulating through coil 23 and outdoor coil 21. The condensate reaches the evaporator 32 through the pipe 43 from which the gas returns into the re-absorber 37 by a pipe 38. The hitherto described apparatus differs from that according to Fig. 1 by the fact that the pressure in the condenser 25 is higher than that in the gas expeller 33. This has the advantage that the condensation occurs already at higher temperatures, so that a comparatively smaller temperature head is sufficient. In order to convey the gas from the vessel under lower pressure, viz. the gas expeller 33, into the vessel under higher pressure, viz. the condenser 25, an absorption machine is interposed between the two. The gas arriving through the pipe 40 is first absorbed in the absorber vessel 26. The gas enriched solution flows through a pipe 44 into the lower end of the evaporator coil 35 which is heated through the medium circulating in sub-soil coil 28. In this coil 35 the gas is again expelled under higher pressure, viz, the pressure of the condenser 25, then separated from the liquid in the gas separator 45 and reaches the condenser 25 through the pipe 42. The depleted liquid descends from the gas separator 45 through the pipe 46 and returns into the absorber 26. This apparatus also works merely under the influence of the temperature heads between the sub-soil and outdoors without mechanically moving parts, so that here also no supervision is required. The necessary differences in pressure are here also balanced by columns of liquid in order to eliminate pumps.

The substances customary in refrigerating engineering may be used as absorption liquid and absorption medium.

The temperature head between flowing water and the ground or flowing water and the air may according to my invention equally well be utilized for the generation of heat.

It will be readily understood that various modifications may be made in the devices embodying my invention and I desire that only such limitations shall be placed thereon as are imposed by the prior art or are specifically set forth in the appended claims.

I claim as my invention:—

1. The method of heating, which consists in utilizing existing temperature differences to raise heat of the existing higher temperature to a still higher temperature level, obtaining the heat for heating purposes by the absorption of a gas in a liquid, expelling the gas again from the solution at lower pressure by means of the existing higher temperature, condensing said gas by the existing lower temperature, and evaporating it again at higher pressure by the existing higher temperature.

2. The method of heating, which consists in utilizing existing temperature differences to raise heat of the existing higher temperature to a still higher temperature level obtaining the heat for heating purposes by the absorption of a gas in a liquid, expelling the gas again from the solution at lower pressure by means of the existing higher temperature, condensing said gas by the existing lower temperature, evaporating it again at higher pressure by the existing higher temperature, and utilizing for this purpose the difference of temperature between the colder atmospheric air and the warmer parts of the ground.

3. The method of heating, which consists in utilizing existing temperature differences to raise heat of the existing higher temperature to a still higher temperature level, obtaining the heat for heating purposes by the absorption of a gas in a liquid, expelling the gas again from the solution at lower pressure by means of the existing higher temperature, condensing said gas by the existing lower temperature, evaporating it again at higher pressure by the existing higher temperature, and balancing the necessary differences in pressure by columns of liquid.

4. The method of heating, which consists in utilizing existing temperature differences to raise heat of the existing higher temperature to a still higher temperature level, obtaining the heat for heating purposes by the absorption of a gas in a liquid, expelling the gas again from the solution at lower pressure by means of the existing higher temperature, condensing said gas by the existing lower temperature, evaporating it again at higher pressure by the existing higher temperature, balancing the necessary differences in pressure by columns of liquid, first absorbing the gas expelled at lower pressure again, expelling it again at a medium pressure and the available higher temperature, and then only condensing and evaporating it again.

In testimony whereof I affix my signature.

EDMUND ALTENKIRCH.